United States Patent [19] Bigalke

[11] 4,426,585

[45] Jan. 17, 1984

[54] CIRCUIT FOR GENERATING A ROTATING FIELD FOR A THREE PHASE SYNCHRONOUS MOTOR SERVING AS A FLYWHEEL STARTER FOR A VEHICLE INTERNAL COMBUSTION ENGINE

[75] Inventor: Erhard Bigalke, Wolfsburg, Fed. Rep. of Germany

[73] Assignee: Volkswagenwerk Aktiengesellschaft, Fed. Rep. of Germany

[21] Appl. No.: 362,254

[22] Filed: Mar. 26, 1982

[30] Foreign Application Priority Data

Apr. 1, 1981 [DE] Fed. Rep. of Germany ....... 3113092

[51] Int. Cl.[3] ........................ H02K 19/36; B60K 9/04; H02P 7/36

[52] U.S. Cl. ................................ 290/38 B; 290/38 R; 318/700; 180/165

[58] Field of Search ..................... 290/38, 38 B, 38 R; 74/572, 859; 180/65 C, 165; 192/0.077; 310/74; 318/700, 705, 716

[56] References Cited

U.S. PATENT DOCUMENTS 3,492,555 1/1970 Shibata ................................ 318/705
3,956,679 5/1976 Chalmers ............................ 318/700
4,110,669 8/1978 Akamatsu ........................... 318/700
4,125,796 11/1978 Nagase et al. .................. 318/716 X
4,238,719 12/1980 Bourbeau ........................... 318/716
4,252,208 2/1981 Heidemeyer et al. .............. 180/165
4,346,773 8/1982 Hofbauer et al. .................... 180/165
4,386,307 5/1983 Webby ............................ 318/700 X

*Primary Examiner*—J. V. Truhe
*Assistant Examiner*—Terrance Flower
*Attorney, Agent, or Firm*—Brumbaugh, Graves, Donohue & Raymond

[57] ABSTRACT

In combination with a brushless, three phase synchronous motor forming part of a flywheel starter of an internal combustion engine and having a stator with field windings and a winding-free toothed rotor having a pole pitch angle, a circuit for generating a rotating field for the windings is disclosed. The circuit includes a sensor positioned near the rotor for generating signals indicative of the pole pitch time of the rotor. A divider circuit is provided for generating a current flow signal for each field winding in response to the sensor signals. A delay network is coupled to the divider circuit and determines a time delay between the start of the pole pitch time and the start of the current flow signals.

8 Claims, 6 Drawing Figures

CIRCUIT FOR GENERATING A ROTATING FIELD FOR A THREE PHASE SYNCHRONOUS MOTOR SERVING AS A FLYWHEEL STARTER FOR A VEHICLE INTERNAL COMBUSTION ENGINE

BACKGROUND OF THE INVENTION

This invention relates to synchronous electric machines, and more particularly, to a novel circuit for generating a rotating field in a synchronous, three phase electric machine which serves as driving motor for a flywheel starter for the internal combustion engine of a vehicle.

An automobile whose flywheel is integrated with an electric motor serving as a generator as well as a starter is known, e.g., from commonly owned German Offenlegungsschrift No. 29 25 675 (corresponding to U.S. application Ser. No. 159,836, filed June 16, 1980). Arrangements of this kind offer a special advantage in that in certain operating states, in particular, when the internal combustion engine does not propel the automobile, the engine, following uncoupling from the flywheel, is stopped and can again be started by use of the kinetic energy stored in the rotating flywheel. Such an arrangement, in which the engine may be selectively stopped and rapidly restarted, offers special energy savings.

The structure of the automobile drive of this kind is disclosed in the aforementioned U.S. application Ser. No. 159,836, which is incorporated herein by reference.

The field windings of a synchronous, three phase motor must be supplied by a rotating field which rotates in proper phase with the rotor of the synchronous motor, such that the rotor is carried along by the rotating field. The various field windings, generally three or six windings, must be supplied during identical current flow angles which must be precisely adhered to. Furthermore, it has been found that the pole wheel angle, i.e., the angle between the rotating field and the rotor of the synchronous motor, must be varied, e.g., to achieve optimum acceleration of the synchronous motor with the coupled internal combustion engine flywheel.

SUMMARY OF THE INVENTION

A circuit in accord with the present invention for generating a rotating field in a brushless, three phase synchronous motor includes a sensor positioned near the toothed rotor of the motor for generating signals indicative of the pole pitch time of the rotor. A divider circuit is included for generating a current flow signal for each field winding in response to the sensor signals. The current flow signals have equal time duration, and the sum of the durations of the current flow signals is a shorter time duration than the pole pitch time. A delay network is coupled to the divider circuit and determines a time delay between the start of the pole pitch time and the generation of the current flow signals which is optimal for the prevailing operation of the motor.

The control circuit is substantially indifferent to tolerances of sensors and electronic components. A circuit according to the present invention permits the precise maintenance of the angles of current flow for all field windings of a synchronous motor, and offers a simple way of varying the pole wheel angle, e.g., during the speeding-up of the synchronous motor.

More particularly, the precision of the circuit arrangement in accordance with the invention is due, above all, to the use of only one ferromagnetic circuit sensor from whose pulse signals, which are indicative of the pole pitch time (in turn, a function of the prevailing rotor rpm), are derived current flow signals for all the field windings. Ferromagnetic circuit sensors of this kind, e.g., Hall generators, magnetoresistor generators or other inductive generators are known. Such devices do not work at zero speed, and suffer from the shortcoming in that their output signals are subject to variations in the air gap between the sensor and the rotor and in ambient temperature. Thus, if one provides individual sensors for deriving the current flow signals for the individual field windings, extensive adjustment work is required in order to eliminate the individual tolerances of the sensors.

The use of only one ferromagnetic circuit sensor and the fact that the current flow signals for all field windings of the synchronous motor are derived from the pulse signals generated by the sensor also greatly simplify the ability to vary the pole wheel angle. In order to change the pole wheel angle, it is necessary only to associate a divider circuit, which derives the current flow signals for the individual field windings, with a time delay circuit which, as a function of a characteristic value indicating the effectiveness of the pole wheel angle set at the time, generates a signal for either maintaining the pole wheel angle at its prevailing value, or for changing the pole wheel angle.

A significant advantage of the invention is constituted by the fact that the circuit arrangement can be assembled from components which are well known. In particular, the divider circuit and the time delay network can be formed by a microcomputer.

BRIEF DESCRIPTION OF THE DRAWINGS

A more complete understanding of the present invention and its advantages will be apparent from the following Detailed Description taken in conjunction with the accompanying drawings in which.

DETAILED DESCRIPTION OF A PREFERRED EMBODIMENT

Figures 1, 3:
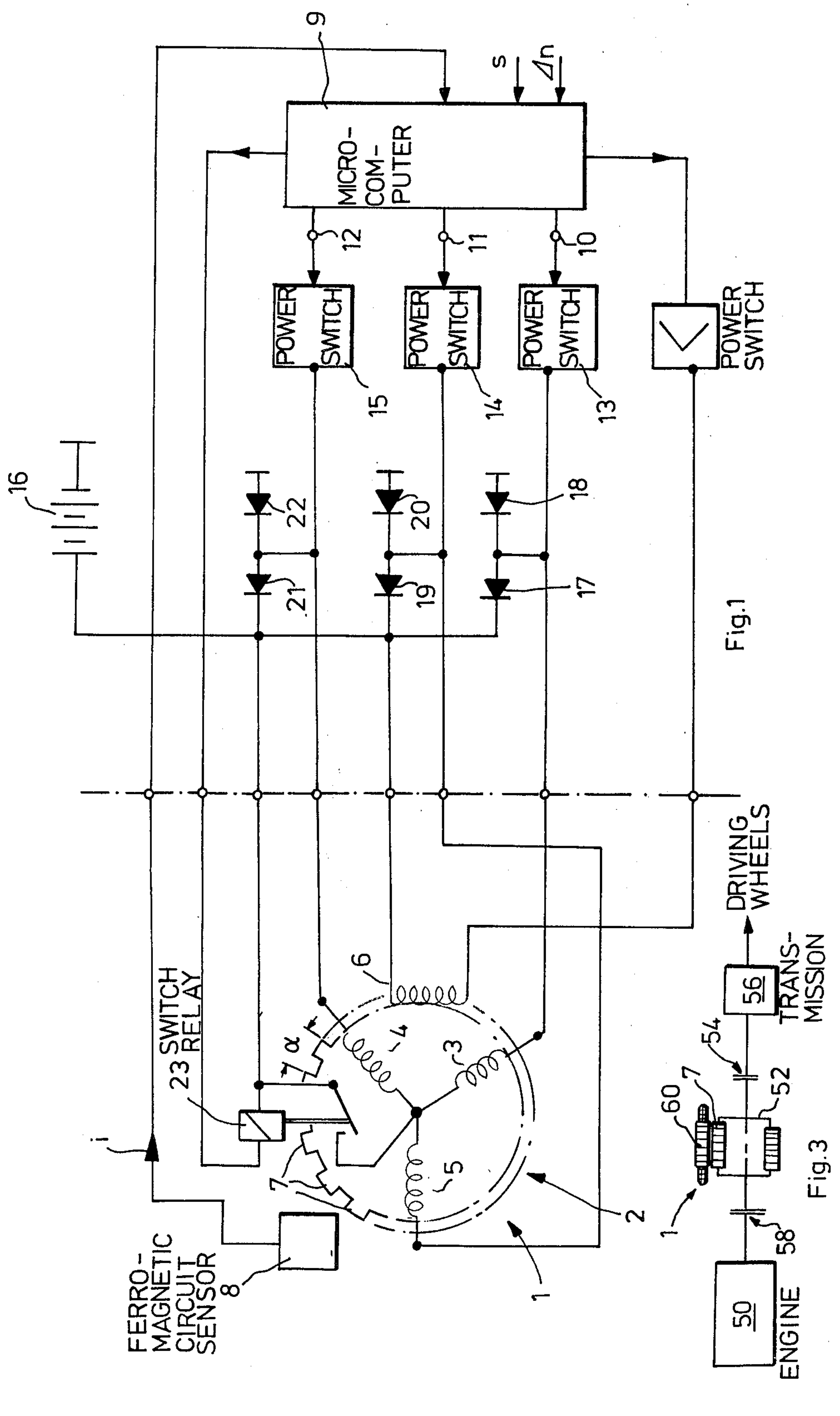
FIG. 1 is a diagram of a circuit in accordance with the present invention.
FIG. 3 is a schematic representation of a vehicle drive incorporating the motor/generator of FIG. 1.

Referring to FIG. 3, a vehicle drive includes an internal combustion engine 50, with the normally present flywheel 52 for equalizing non-uniformity of engine output torque. A first clutch 54 is arranged between the flywheel 52 and transmission 56 for shifting gears, and a second clutch 58 is arranged between the flywheel 52 and engine 50 for selectively disconnecting the flywheel and engine. In accordance with the teachings of U.S. application Ser. No. 159,836, a motor/generator 1 is associated with the flywheel including a toothed, windingless rotor 2 as well as a stator 60.

In a preferred starting vehicle method, both clutches 54 and 58 are actuated to disconnect the flywheel from both the engine and transmission, and the flywheel is accelerated to a predetermined rpm and then connected to the engine 50 to start the engine. When the vehicle is stopped, the engine is disconnected from the flywheel and stalls. During such time, if necessary, the free spinning flywheel is periodically accelerated to maintain it at an rpm sufficient to restart the engine. In both cases, the motor/generator 1 operates as a driving motor. In other vehicle operating states, the motor/generator functions as a generator to recharge the battery and power the vehicle electrical system.

In FIG. 1, a synchronous, three phase motor 1 is provided with a winding-free rotor 2 as well as with a stator (not shown in FIG. 1) which in this embodiment contains three field windings 3, 4 and 5 as well as a direct-current exciting winding 6. The motor 1 of FIG. 1 is thus a contactless or brushless synchronous motor. The rotor 2 is provided with teeth 7 which extend radially outwardly and which are made of magnetic material. Spaces between the teeth 7 are non-magnetic and can, in one embodiment, be filled in with a heavy non-magnetic material in order to increase the mass of the rotor 2 (which forms part of the flywheel 52 of the internal combustion engine). Commercial synchronous motors have, e.g., 39 teeth. The embodiment of FIG. 1 has a defined pole pitch angle $\alpha$.

The field windings 3, 4 and 5 (as a matter of principle, any multiple of three field windings may be used) must be sequentially supplied with current during equal time durations of current flow. A ferromagnetic circuit sensor 8, e.g., a Hall generator, is fixed in the zone of the track of travel of the teeth 7 of the rotor 2. The angles of current flow appear as a current flow time $\alpha_t$ which is a function of instantaneous rotor rpm. The circuit of FIG. 1 produces current flow signals for the three field windings 3, 4 and 5 from the pulse signals generated by the single ferromagnetic circuit sensor 8 in accord with the aforementioned requirements.

Figure 2:
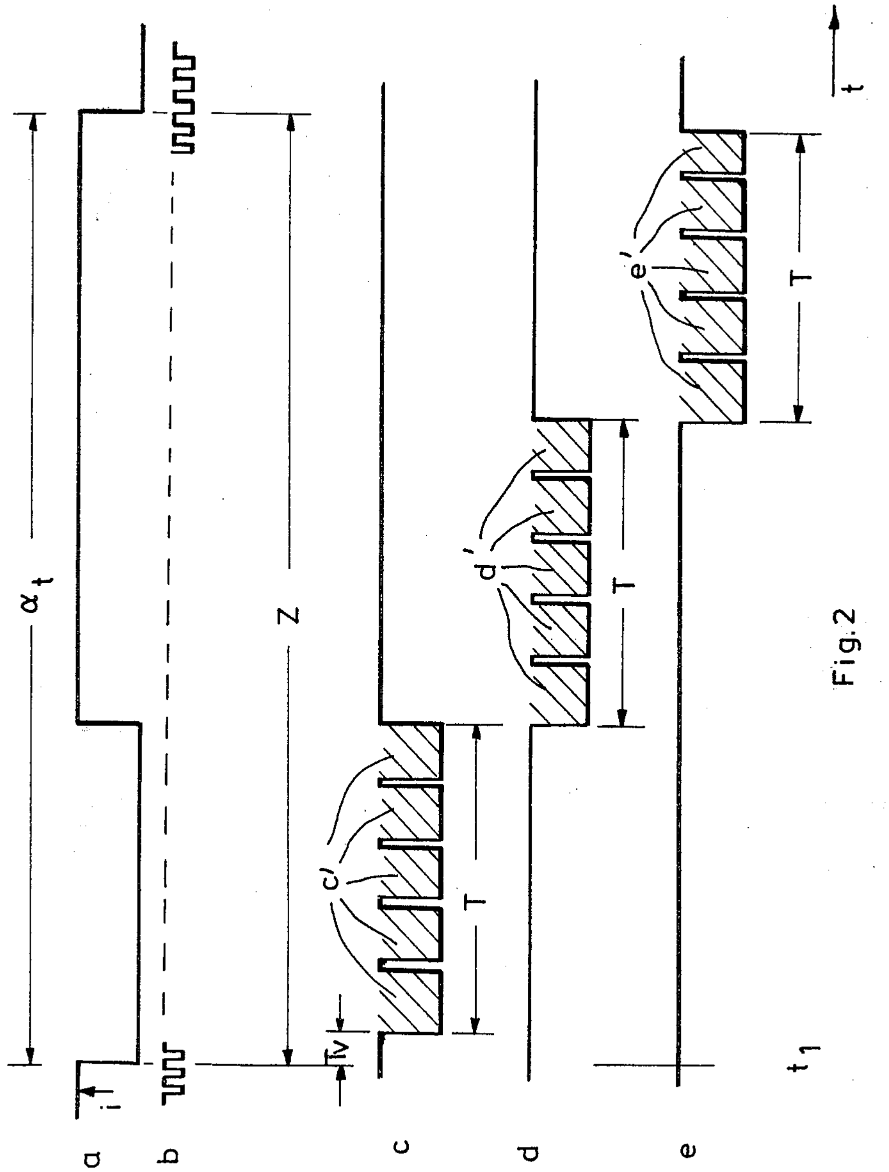
FIG. 2 is a timing chart illustrating the operation of the embodiment of the invention of FIG. 1.
Figure 4A:
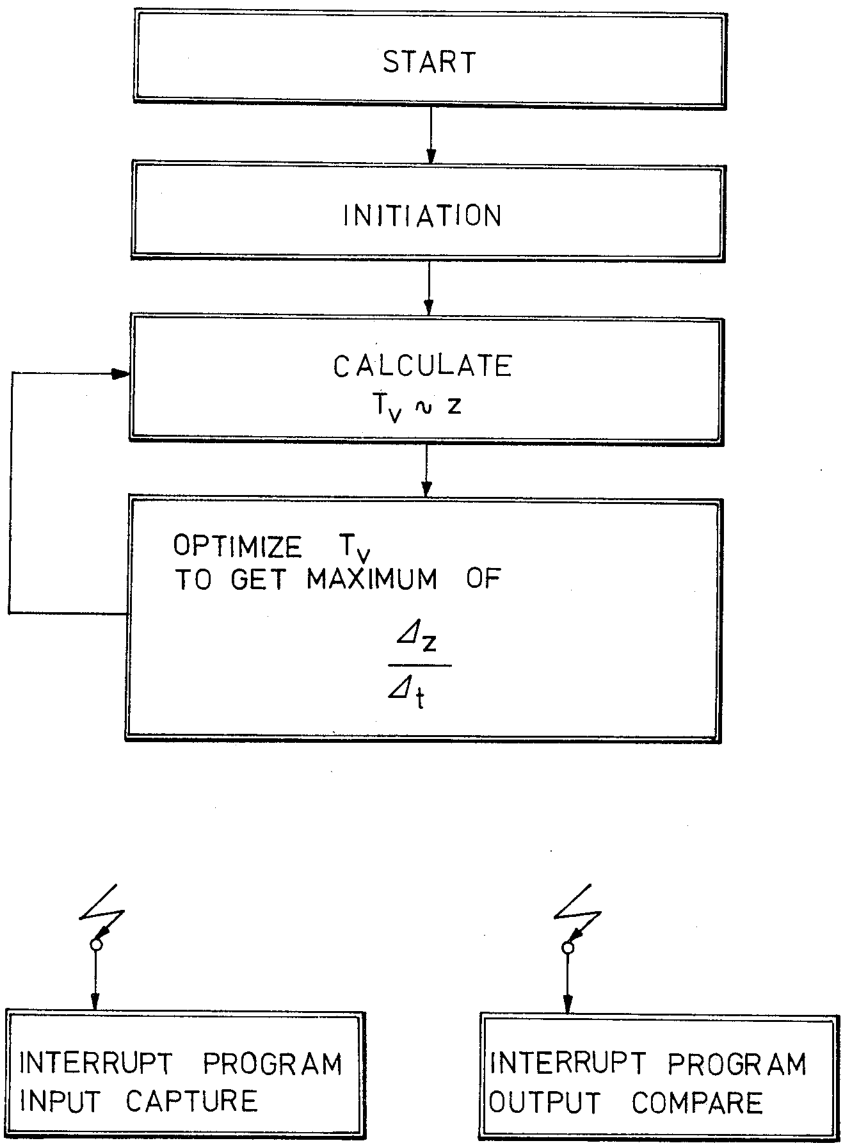
FIGS. 4A–C are flow charts for a microprocessor used in the circuit shown in FIG. 1.
Figure 4B:
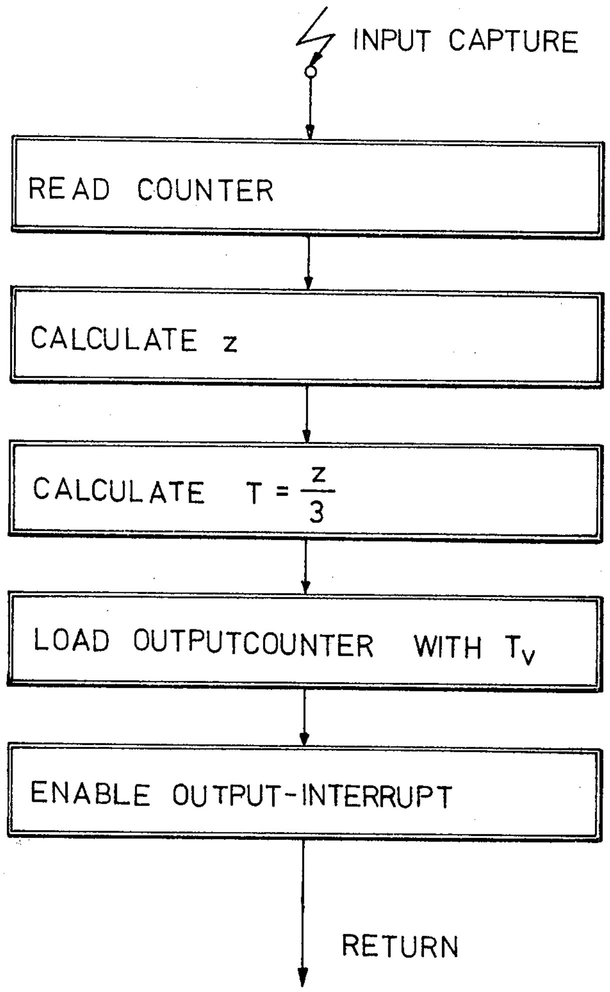
Figure 4C:
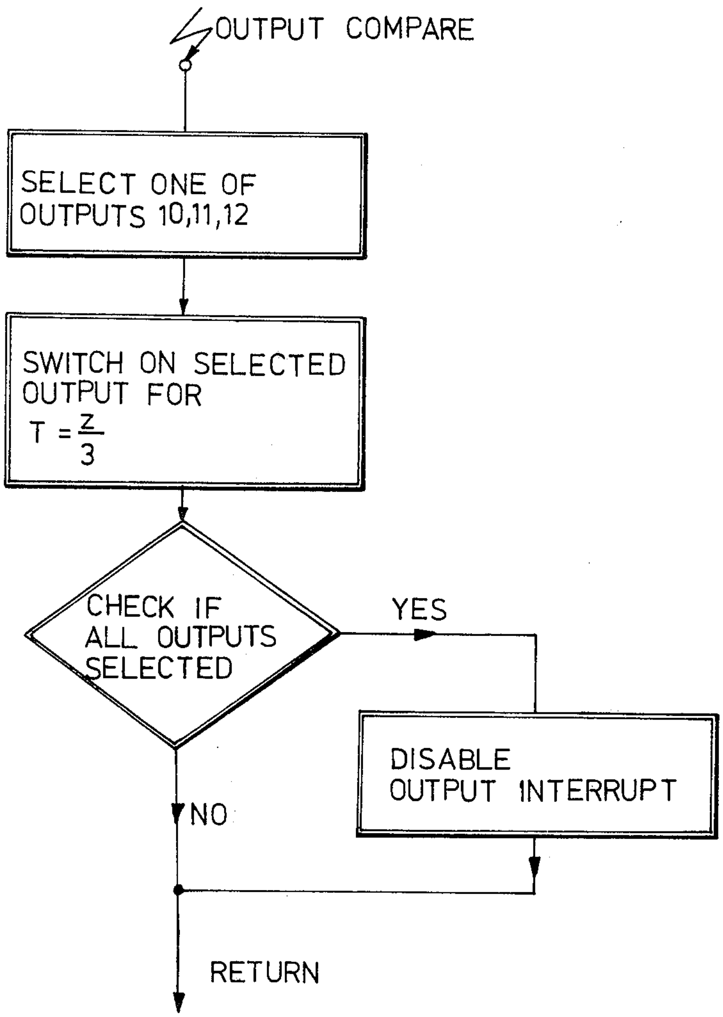

With reference to the time diagrams in FIG. 2, in diagram a, the sensor 8 delivers a pulse signal i which reflects the pole pitch time. The "pole pitch time" is the time required for one tooth and one space of rotor 2 to rotate past the sensor 8. This signal is delivered to a microcomputer 9 which contains a timer whose clock pulses are indicated as b in FIG. 2 and whose flow chart in case of using a Motorola 6801 is shown in FIGS. 4A, 4B and 4C. In this embodiment of the invention, the clock frequency is very high relative to the frequency of a pulse signal i. The microcomputer counts the number z of the clock pulses which fall within the pole pitch time $\alpha_t$. This count is then divided by the number of the field windings 3, 4 and 5, e.g., by 3, and three successive pulse signals, c, d and e, all having the same time duration T, are delivered sequentially, one each to an output 10, 11 and 12 of the microcomputer 9. These signals are delivered to the field winding concerned via each of transistor power switches 13, 14 and 15, and constitute the current flow signals for each of the field windings 3, 4 and 5.

In FIG. 2, each of the current flow signals c, d and e is composed of several individual pulses c', d' and e'. This subdivision of the current flow signals limits the starting current of the synchronous motor 1 in order to protect the transistors in the power switches 13, 14 and 15. The current in the field windings 3, 4 and 5 increases in accordance with an exponential function in dependence with the size of the known inductances of the field windings. After a time preset by the microcomuter 9, the flow of the current flow signals c, d and e is temporarily interrupted to the power switches 13, 14 and 15 so that the current does not exceed a predefined limit value.

In the time intervals between the individual pulses c', d' and e', the corresponding field winding has current.

FIG. a illustrates that the field windings 3, 4 and 5 are connected to a vehicle battery 16 by a series connection of two rectifier diodes 17, 18; 19, 20; and 21, 22. The pairs of series connected rectifiers 17 to 22 are connected in parallel with the battery 16. The rectifiers take over the Lenz currents of the field windings 3, 4 and 5 following the cutoff of each of the power switches 13, 14 and 15. Moreover, the rectifiers dampen any voltage peaks which may occur on disconnection of the transistors in the power switches 13, 14 and 15. Finally, if the synchronous motor 1 also serves as a generator for the vehicle (a switching relay 23 is provided for selection between generator and motor operation) the diodes 17 to 22 act as true rectifiers. Thus, the diodes fulfill a total of three different functions.

The microcomputer 9 ensures that the total time duration of the three current flow signals c, d and e is somewhat shorter than the pole pitch time $\alpha_t$. The first current flow signal c as shown in FIG. 2, is delivered to the winding 3 only after a predetermined time delay $T_v$. The microcomputer 9 contains a clock pulse counter of conventional construction for the clock pulses designated in FIG. 2 by b. When the clock pulse counter reaches a clock or timing pulse number which corresponds to several rotations of the rotor 2, e.g., upon reaching an upper capacitance limit of the counter, it delivers to a comparator network, also contained in the microcomputer 9, a command to check the delay time $T_v$, indicated in FIG. 2, for delivery of the first current flow signal c. Renewed checking of the delay time $T_v$ accordingly occurs only after a time interval in which a substantial speed change of the rotor may have occurred.

Signals which represent the speed changes $\Delta n$ in rotor rpm (resulting in changes $\Delta z$ of the number of clock pulses z) in the time interval between the start and the end of the counting process effected by the clock pulse counter are sent to a conventional comparator network. During this time interval, the delay time $T_v$ remains constant. After the counting process has been completed, e.g., at the time $t_1$the comparator network compares the speed change $\Delta n$ with the change in rotor speed (stored in the microcomputer) which occurred during the preceding counting interval. The change of speed measurements, i.e. acceleration $(\Delta z)/(\Delta t)$ ($\Delta t$ being the time interval between successive evaluations of measurements of the rpm) during the last counting process relative to the preceding counting process, are used as a criterion to determine whether a change in the delay time $T_v$ should be effected and, if so, in which direction. Thus, the comparator network can determine, e.g., that the most recently effected modification of $T_v$ counteracted a desired speed increase, in which case the modification must be cancelled or replaced by a modification of $T_v$ in the opposite direction. The comparator network, however, may also determine that the modification of $T_v$ had a very favorable effect, in which case no command for a change of $T_v$ is generated. Finally, the change of $T_v$ may have had only a minor positive effect, in which case, the comparator network will cause an additional change in the same direction. Thus, the circuit of FIG. 1 is responsive to the acceleration of the motor 1.

In the disclosed embodiment, the microcomputer 9 receives a control signal s when the operation of the associated internal combustion engine is normal, i.e., the engine need not be accelerated (started) by the synchronous motor 1 at that time. However, so that the flywheel maintains sufficient kinetic energy to be able to restart the engine, its rotational speed should not fall below a predetermined minimum. During such times as the engine is stopped, the motor 1 rotates the flywheel at constant speed at the predefined minimum rpm for restarting the internal combustion engine. The microcomputer 9 delivers considerably shorter current flow signals to the individual field windings 3, 4 and 5. The control signals s cause a corresponding shifting in the microcomputer. For example, the shifting may result in a halving of the angles of current flow relative to their values during speeding-up (somewhat less than 120° in the case of three field windings).

While one embodiment of the present invention has been disclosed in the drawings and described in detail herein, various further modifications may be made without departing from the spirit and scope of the invention, and such modifications are intended to be included within the scope of the appended claims.

I claim:

1. In combination with a brushless, three phase synchronous motor and an internal combustion engine having a flywheel, said motor acting as a driving motor for a flywheel wherein said flywheel is capable of coupling as a flywheel starter for said engine, said motor having a stator rigidly connected to stationary elements of said engine and a plurality of field windings, and a winding-free toothed rotor rigidly connected to said flywheel and having a pole pitch angle, a circuit for generating a rotating field for said field windings comprising:

ferromagnetic sensor means positioned proximate said toothed rotor for generating signals indicative of the pole pitch time of said rotor;

divider circuit means coupled to said sensor signals for generating a current flow signal for each field winding in response to said sensor signals, said current flow signals having equal time duration, and the sum of the durations of said current flow signals being less than said pole pitch time; and delay network means coupled to said divider circuit means for determining a time delay between the start of said pole pitch time and the start of said current flow signals which is optimal for the prevailing operation of said motor.

2. The circuit of claim 1 wherein said divider circuit means and said delay network means comprise a microcomputer including:

means for generating a pulse count sum signal indicative of the time duration of said pole pitch time;

means for dividing said pulse count sum signal by said number of field windings; and comparison means for deriving said time delay.

3. The circuit of claim 2 wherein said microcomputer includes an output for each of said field windings for carrying each of said current flow signals to said field windings, and further comprising electronic power switches for coupling said outputs to said field windings.

4. The circuit of claim 3 wherein said microcomputer divides said flow signals into pulses whereby said power switches include a starting current limitation as a function of the inductance of said field windings.

5. The circuit of claim 3 or 4 and further comprising:

a battery; and a pair of series connected rectifiers for each of said field windings, each of said field windings and each of said corresponding power switches connected between said corresponding pairs of rectifiers, and said pairs of rectifiers being connected in parallel to said battery.

6. The circuit of claim 2, 3 or 4 wherein said microcomputer includes switch means for reducing said duration of said current flow signals whereby said flywheel rotates at a slower constant speed.

7. The circuit of claim 2, 3 or 4 wherein said microcomputer includes a timing pulse counter means for generating a command to said comparison means to check said time delay after a predetermined number of revolutions of said flywheel.

8. The circuit of claim 7 wherein said comparison means alters said time delay in accord with a change in the acceleration of said motor.

* * * * *